July 12, 1960 W. SCHAFFERNICHT ET AL 2,945,142

ELECTRONIC LINE STORAGE DEVICE

Filed June 13, 1958 2 Sheets-Sheet 1

Inventors
WALTER SCHAFFERNICHT
JOACHIM EBERHARDT OTTO
By: Eric D. Frankel
PATENT AGENT July 12, 1960 W. SCHAFFERNICHT ET AL 2,945,142

ELECTRONIC LINE STORAGE DEVICE

Filed June 13, 1958 2 Sheets-Sheet 2

Inventors
WALTER SCHAFFERNICHT
JOACHIM EBERHARDT OTTO
By: Eric D. Frankel
PATENT AGENT 2,945,142

ELECTRONIC LINE STORAGE DEVICE

Walter Schaffernicht and Joachim Eberhardt Otto, Ulm (Danube), Germany, assignors to Telefunken G.m.b.H., Berlin, Germany Filed June 13, 1958, Ser. No. 741,904

Claims priority, application Germany June 22, 1957

3 Claims. (Cl. 313—68)

This invention relates to an electronic line storage device.

Electronic line storage devices have extensive applications in radar technique where they are used for compressing the band of the radar signal to be transmitted. The radar apparatus delivers short pulses, each of which corresponds to a radial line on the picture screen. The interval between two successive pulses has a duration that is a multiple of the pulse duration. If such pulses are written on a line storage device, they can be slowly read out during the intervals and fed to the receiver. Because of their smaller frequency range, these slowly read output signals require a much less expensive transmission line.

Figure 1:
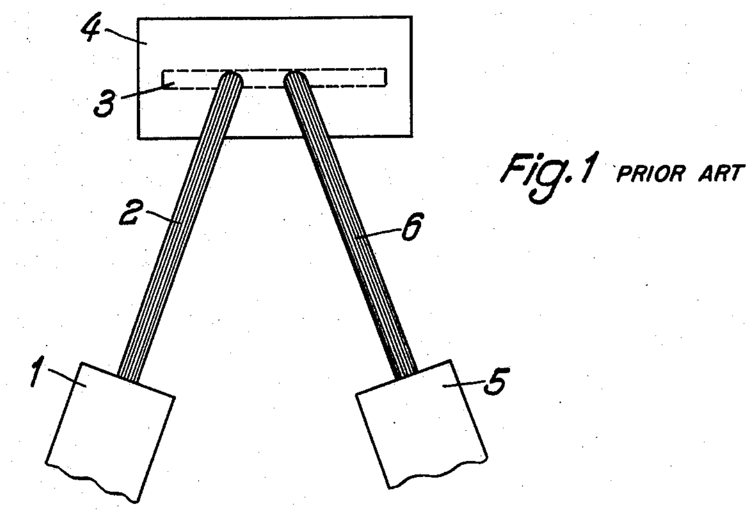
Fig. 1 PRIOR ART

The principle of such a storage device is illustrated in Fig. 1 representing a prior-art device; the electron beams are considerably enlarged. The writing beam 2 from the electron gun 1 writes down a signal in the form of charges along the line 3 of the storage plate 4. The reading beam 6 from the electron gun 5 also scans the line 3, thus deriving the signal information stored in the device, as well known in the art. Electron beams 2 and 6 are produced as round cross-section beams.

In order to achieve high definition, the diameter of the electron beams must be very small at the point of impact on the storage plate 4. It is however, difficult to maintain the electron beams in exact coincidence with the storage line 3. Very small manufacture tolerances, in particular in the deflecting systems, interference in the deflecting voltage and external stray fields can already lead to some deviation of the electron beams from the straight storage line 3. This absence of coincidence on part of the line results in fluctuation or even in complete disappearance of the signal level at the storage device output. Thermal variations in the storage tube system also require voltage resetting during operation of the storage device, this being noticeable in a troublesome manner.

Other well known electronic line storage devices operate with a single electron beam which is caused selectively to write and to read. The aforementioned difficulties occur in these devices too, owing to the interference effects already mentioned. Also, there may appear deviations from the normal track in different points and at different instants, so that the electron beam does not accurately read out the track it has written.

The object of the invention is to provide an electronic line storage device operating in a more reliable manner.

According to the present invention, at least one of the electron beams is so generated that at the point of impact on the storage surface its cross section normal to the direction of deflection is greater than its cross section parallel to said direction. At least one electron beam is preferably a strip-shaped beam.

Figure 2:
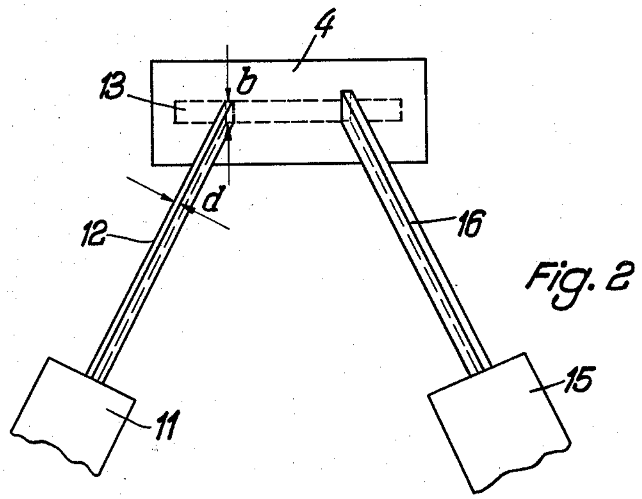

In Fig. 2 there is shown a form of embodiment of the invention. The writing beam 12 from the electron gun 11 is a strip-shaped beam. It has a very small thickness

*d*, so that the definition as measured longitudinally of the target 13 is not less than it would be when using a round cross-section beam. However, its width *b* is greater, with the result that the storage area of the target 13 on the plate 4 is wider than the area 3 of Figure 1. The reading beam 16 from the electron gun 15 has a corresponding shape.

Since the electron beams of the line storage device according to the invention are wider in the direction normal to the direction of deviation than the electron beams of a conventional line storage device, it is easy to maintain them in coincidence with the whole storage track. Even when an electron beam (such as 16 in Fig. 2) is slightly deviated from the mid-line of the track, there remains always sufficient registration between the tracks of the two beams, so that the above mentioned interference cannot occur.

Figure 3:
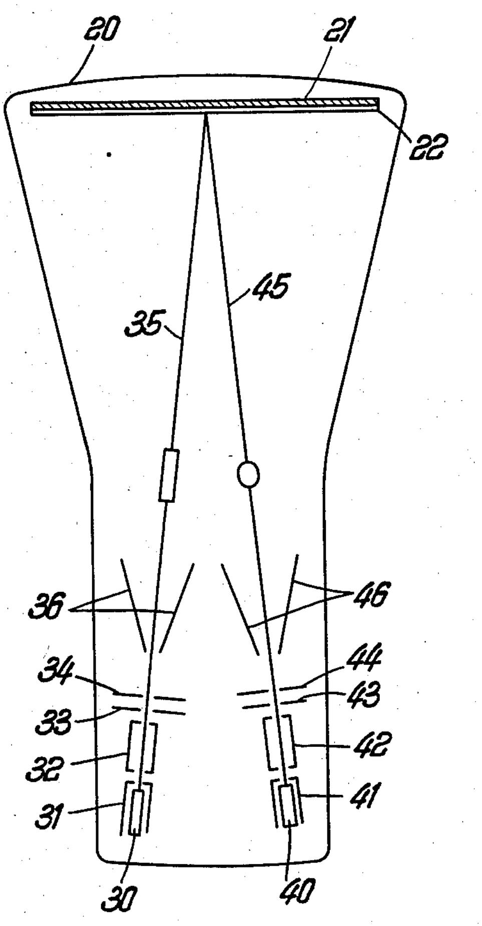

In Fig. 3 there is shown a two-gun line storage tube according to the invention. The storage device mounted in the tube 20 comprises a signal plate 21 and a storage layer 22. One electrode system consists of a cathode 30, a control grid 31 and a cylindrical lens system consisting of the lenses 32, 33, 34 and generates a strip-shaped beam 35, such as illustrated for example in 12 in Fig. 2. The electron beam 35 can be deflected by means of the deflecting plates 36 to scan the line storage device 22. The other electrode system comprising the cathode 40, the control grid 41 and the lenses 42, 43, 44 generates an electron beam 45, which may have a circular cross-section, such as the electron beam 2 shown in Fig. 1. The beam 45 can be deflected by means of the deflecting plates 46 to scan the storage device. The electrode systems are tilted toward each other.

If information is written into the storage device 22 by means of the round-cross-section beam 45, it can be read out by the strip-shaped beam 35. The read-out signal now contains the whole information even when the tracks of the two electron beams do not coincide exactly, since the reading beam 35 scans the whole surface of the written track, though slight deviations due for example to heat variations may occur between the two tracks.

In a line storage device using a single electron beam for alternately writing and reading, this beam will have a strip-shaped structure.

A strip-shaped beam can be produced by various methods, such as flattening an electron beam having an original round section by means of a cylindrical lens, forming a rectangular beam out of, say, a round beam by means of field stops, or using a system wherein the emitting area of the cathode has already a rectangular cross-section. These various methods may also be employed in combination. A rectangular beam can be focused by axially symmetrical or cylindrical focusing fields. In some applications it is sufficient to diaphragm out the electron beam in width and thickness and to focus it in thickness only through a cylindrical lens. Preferably, two cylindrical lenses are used for focusing. The strip-shaped beam is focused to the desired width by means of the first lens and to the desired thickness by means of the second one.

We claim:

1. An electronic line storage and read-out device comprising electron gun means for emitting a writing beam for depositing information in the form of electrical charges along a trace and a reading beam adapted to derive information from said charges by scanning along said trace, wherein at least said writing beam is strip-shaped and has its major dimension disposed in a direction transverse to said trace.

2. An electronic line storage and read-out device comprising electron gun means for emitting a writing beam for depositing information in the form of electrical charges along a trace and a reading beam adapted to derive information from said charges by scanning along said trace, wherein only said writing beam is strip-shaped and has its major dimension disposed in a direction transverse to said trace.

3. An electronic line storage and read-out device comprising electron gun means for emitting a writing beam for depositing information in the form of electrical charges along a trace and a reading beam adapted to derive information from said charges by scanning along said trace, wherein each of said beams is strip-shaped and has its major dimension disposed in a direction transverse to said trace.

References Cited in the file of this patent

UNITED STATES PATENTS 2,276,359 Von Ardenne ---------- Mar. 17, 1942

FOREIGN PATENTS 655,485 Great Britain ----------- July 21, 1951
1,042,066 France ----------------- June 3, 1953